United States Patent [19]

Westermann

[11] 4,100,123

[45] Jul. 11, 1978

[54] POLYCHLOROPRENE-CONTAINING BLENDS

[75] Inventor: Peter Henry Westermann, Dorking, England

[73] Assignee: The British Petroleum Company Limited, London, England

[21] Appl. No.: 759,244

[22] Filed: Jan. 13, 1977

[30] Foreign Application Priority Data

Jan. 16, 1976 [GB] United Kingdom ............... 1716/76

[51] Int. Cl.² .................................................. C08L 95/00
[52] U.S. Cl. ........................ 260/28.5 B; 260/28.5 D; 260/33.6 A; 260/889
[58] Field of Search ............. 260/28.5 B, 889, 28.5 D

[56] References Cited

U.S. PATENT DOCUMENTS

| 3,492,371 | 1/1970 | Barrett | 260/889 |
| 3,830,881 | 8/1974 | Woods et al. | 260/889 |
| 4,036,799 | 7/1977 | Westermann | 260/28.5 B |

Primary Examiner—Lewis T. Jacobs
Attorney, Agent, or Firm—Brooks, Haidt, Haffner & Delahunty

[57] ABSTRACT

Blends comprising (1) a rubber component containing polychloroprene and a defined amount of EPDM, (2) hardened extract, (3) a vulcanization agent.

18 Claims, No Drawings

POLYCHLOROPRENE-CONTAINING BLENDS

The present invention relates to vulcanisable blends containing chloroprene rubber, and to vulcanised products obtained from the blends.

Polychloroprene rubbers are expensive and it is often desirable to make blends of these rubbers with other, cheaper, materials, where this can be done without undue sacrifice of the desirable properties of the chloroprene rubbers. It is disclosed by Mayo in Ind. Eng. Chem. Volume 42 pages 696–700 that polychloroprene rubber may be blended with a variety of materials including asphalt.

Our copending application U.S. Ser. No. 661,606 filed on Feb. 26, 1976 now U.S. Pat. No. 4,036,799, discloses vulcanisable blends of polychloroprenerubber with a material known as "hardened extract" which gives superior properties to those obtained by blending polychloroprene rubber with bitumen.

As indicated above polychloroprene rubbers are expensive and it would be desirable if some of the polychloroprene rubber in polychloroprene/hardened extract blends could be replaced by other, cheaper, rubbers without adversely affecting the desirable properties imparted by the polychloroprene. It would also be desirable in some cases if the brittle temperature of the vulcanised blend could be reduced.

It has now been found that some of the polychloroprene in polychloroprene/hardened extracts blends may be replaced by certain rubbery polymers without substantially affecting desirable properties of the blend when formed into vulcanised products. This is surprising as such physical properties of the vulcanised blend as tensile strength and modulus are poor when mixtures of the rubbery polymer and hardened extract alone are used.

According to the present invention there is provided a vulcanisable composition comprising (a) a rubber component containing a polychloroprene and EPDM, as hereinafter defined, in a weight ratio of from 1:0.05 to 1:1.5, the EPDM containing at least 50% by weight of units derived from ethylene, and (b) 3–300 parts by weight, per 100 parts of the rubber component of a hardened extract having a saturated hydrocarbon content of not more than 10% by weight.

According to another aspect of the present invention there is provided a vulcanisable composition comprising (a) a rubber component containing a polychloroprene and EPDM in a weight ratio of from 1:0.05 to 1:1.5, the EPDM containing at least 50% by weight of units derived from ethylene, and (b) 3–300 parts by weight, per 100 parts of the rubber component of a hardened extract having a saturated hydrocarbon content of not more than 10% by weight, and (c) a vulcanisation agent.

According to yet another aspect of the present invention there is provided a vulcanised product made by vulcanising a composition comprising (a) a rubber component containing a polychloroprene and EPDM in a weight ratio of from 1:0.05 to 1:1.5, the EPDM containing at least 50% by weight of units derived from ethylene and (b) 3–300 parts by weight, per 100 parts of the rubber component of a hardened extract having a saturated hydrocarbon content of not more than 10% by weight, and (c) a vulcanisation agent.

By 'vulcanisable composition' is meant a composition which either as it is, or on addition of a vulcanisation system can be vulcanised on being subjected to the required temperature.

The polychloroprene in the rubber component may be a homo polymer but may optionally contain units derived from a comonomer. Thus comonomers such as styrene or 2,3-dichlorobutadiene may be used to modify such polymer properties as rate of crystallisation. The quantity of comonomer used preferably is not more than 50% by weight of the total monomeric material, or preferably not more than 10% by weight of the monomeric material. The polychloroprene used in the process of the present invention may be any polychloroprene capable of being vulcanised. It may be a sulphur modified polychloroprene, or a polychloroprene made using a mercaptan modifier, e.g. dodecyl mercaptan, or a dialkyl xanthogen disulphide e.g. diethyl xanthogen disulphide.

The Mooney viscosity (ML1+4) of the polychloroprene may vary over a moderately wide range for example 15 to 75. The Mooney viscosity may typically be in the range 55 to 65. It may be particularly advantageous however to use polychloroprenes having Mooney viscosities of 65 to 75 in the compositions of the present invention.

"EPDM" as used throughout this specification means a rubbery terpolymer of ethylene, propylene, and a diene or triene monomer. Examples of suitable monomers are: Cis-cis-1, 5-cyclo-octadiene, 5-ethylidene-2-norbornene, or dicyclopentatriene. These rubbers are well known to those skilled in the art. The EPDM used in the rubber component of the present invention contains at least 50% by weight of units derived from ethylene, preferably at least 70% by weight of units derived from ethylene. Units derived from propylene may for example constitute 49–20% by weight of the polymer. Units derived from the diene monomer may for example constitute 1–5% by weight of the polymer. An example of a suitable diene monomer is ethylidene-norbornene. The ratio of polychloroprene to EPDM in the rubber component is preferably such that there are at least 0.08 parts of EPDM per part of polychloroprene more preferably at least 0.1 part of EPDM per part of polychloroprene. Preferably there are not more than 1.2 parts of EPDM per part of polychloroprene (all parts are by weight).

Throughout this specification 'hardened extract' means a product obtained by blowing air into a petroleum extract at elevated temperature e.g. 250°–350° C, the petroleum extract having been obtained by the solvent extraction of a distillate petroleum fraction boiling in the lubricating oil boiling range e.g. 350°–600° C and containing a major proportion of aromatic hydrocarbons. Examples of solvents which may be used to extract the distillate petroleum fraction are furfural, phenol and N-methyl pyrrolidone. The distillate subjected to extraction does not contain asphaltenes, and this extraction process must be distinguished from the use, for example, of liquid propane to obtain a product rich in asphaltenes from residues, which is sometimes described as a "solvent" process.

The 'hardened extract' resulting from the air blowing referred to above is a solid material at room temperature. In order to obtain a hardened extract having the desired low content of saturated hydrocarbon it may be necessary to select a petroleum extract in which the saturated hydrocarbon content is low. The choice of a suitable petroleum extract can readily be made by the man skilled in the art on the basis of simple tests. The blowing with air may be carried out in the presence of a catalyst e.g. a metal halide Friedel-Crafts catalyst such as ferric chloride, or without a catalyst.

The hardened extracts used in the present invention are to be distinguished from bitumens. When crude oil is distilled to remove materials boiling up to the end of the gas oil range, the resulting residue can be subjected to vacuum distillation to recover waxy distillates. This vacuum residue can be further distilled to yield straight run bitumen or it may be air blown to yield bitumens having high softening points and low penetration.

Hardened extracts are available having a range of softening points. Thus hardened extracts having softening points ranging from 50° C to 200° C may be used. It is preferred to use hardened extracts having a softening point in the range 85°–150° C and more preferably in the range 100°–150° C. The softening point of hardened extract is measured by the ring and ball test used to determine the softening point of bitumens. This is described in Chapter 13 Page 12 of "Petroleum Products Handbook" edited by Guthrie and published 1960 by McGraw Hill.

The preferred weight ratio of hardened extract to the rubber component will depend upon the purpose for which the composition is to be used. Hardened extract is cheaper than polychloroprene and the maximum quantity of hardened extract will be used consistent with the desired properties being obtained. It is preferred to use at least 15 preferably at least 25 more preferably at least 45 parts of hardened extract per 100 parts of the rubber component. It is preferable to use not more than 200 parts, more preferably 150 parts, of hardened extract per 100 parts of the rubber component of the composition. The use of large proportions of hardened extract of low softening point may give a product which is difficult to process in unvulcanised form on conventional rubber processing machinery. Thus it is preferred to use less than 200 parts, for example less than 150 parts of hardened extract of 90° C softening point per per 100 parts of the rubber component. By contrast, in a polychloroprene/hardened extract blend it is desirable to use less than 100 parts, for example less than 50 parts, of 60° C softening point hardened extract per 100 parts of polychloroprene.

The compositions of the present invention may contain additives, fillers and extenders conventionally used in the polychloroprene rubber art, for example carbon black, anti-oxidants, magnesia, or aromatic oils. The process oil referred to above may be any of the process oils well known in the rubber processing art.

The compositions of the present invention may contain a minor amount of bitumen i.e. up to 25 parts bitumen per 100 parts of hardened extract.

The hardened extract and the rubber component may be blended by mixing at a moderately elevated temperature preferably from 80° to 140° C. It is believed that there is some interaction between the hardened extract and the polychloroprene and that this interaction is promoted by heating the blend.

As with conventional polychloroprene, the compositions of the present invention are vulcanised in order to convert them to useful products. Many vulcanisation agents are known and can be used with the present compositions provided that the hardened extract does not inhibit the vulcanisation reaction. The vulcanisation agent may be a single compound or a mixture of compounds. The suitability of a given vulcanisation agent is readily determined by experiment. Thus polychloroprenes that have been prepared in the presence of sulphur give compositions according to the present invention that can readily be cured by a conventional vulcanising agent consisting of zinc oxide and ethylene thiourea. However a mercaptan modified polychloroprene gives rise to compositions that will not cure satisfactorily with this mixture and it is necessary to add additional vulcanising agent components such as sulphur DOTG (di-o-tolylguanidine) and tetramethyl thiuram monosulphide.

The vulcanisation agent may be incorporated at the time the hardened extract and the rubber components are mixed together, in which case either it should be inactive at the mixing temperature, or the time of mixing should be short compared with the time required for vulcanisation. Preferably the vulcanising agent is mixed into the composition after the hardened extract, polychloroprene and EPDM have been blended together.

The composition containing the vulcanisation system is subjected to a forming operation e.g. compression moulding or extrusion or calendering before it is vulcanised to achieve the desired final properties. The time and temperature required for vulcanisation can be readily determined by simple tests.

Vulcanisates of polychloroprene/EPDM/hardened extract blends are characterised by good tensile and tear strength, good elongation at break, freedom from undesirable tack at room temperature and good low temperature properties. In addition they exhibit low resilience and have the property of absorbing a high proportion of applied energy when deformed. Compositions of the present invention may thus be used as membranes for water storage, and in applications such as sound absorption and vibration or oscillation damping devices.

Vulcanisates of polychloroprene/EPDM/bitumen generally have lower tensile and tear strengths than those of polychloroprene/EPDM with an equivalent loading of hardened extract. In addition vulcanisates of polychloroprene/EPDM/bitumen suffer from undesirable tackiness and cause staining of materials they come in contact with.

The invention will now be illustrated by reference to the following Examples, in which examples identified by numbers are examples according to the invention and examples identified by letters are comparative Examples. There are no Examples I, or L to avoid confusion with Example 1.

In the following Examples tests were carried out on various blends of polychloroprene, EPDM rubber, bitumen, and hardened extracts. The blends were prepared as follows:

The rubbers, polychloroprene and EPDM, were mixed with the hardened extract or bitumen and optionally carbon black in a Brabender rubber mixing head or Banbury at 100°–130° C for 5–15 minutes until a homogeneous mix was obtained. The mix was allowed to cool to 100° C before addition of the curing agents which were then mixed in for a further 2 to 5 minutes.

The characteristics of the bitumen and hardened extracts used in the Examples are set out below:

TABLE 1

|  | 115/15 Blown Kuwait Bitumen | 150/1 Hardened Extract Type B | 100 Hardened Extract Type A | 150 Hardened Extract Type A |
|---|---|---|---|---|
| Softening Point (Ring and Ball)° C | 115 | 150 | 100 | 150 |
| Penetration at 25° C | 15 | 1 | 1 | 1 |

TABLE 1-continued

|  | 115/15 Blown Kuwait Bitumen | 150/1 Hardened Extract Type B | 100 Hardened Extract Type A | 150 Hardened Extract Type A |
|---|---|---|---|---|
| mm/10 | | | | |
| Analysis % | | | | |
| Saturates | 18.1 | 4.9 | 2.0 | 0.8 |
| Cyclics | 33.2 | 30.3 | 46.0 | 34.0 |
| Asphaltenes | 32.5 | 55.8 | 25.0 | 20.0 |
| Resins | 14.9 | 8.8 | 17.0 | 13.0 |
| Toluene Insolubles | 2.1 | 0.2 | 11.0 | 34.0 |

The composition of hardened extracts and bitumens may be determined on the basis of broad chemical composition. In this method "asphaltenes" are defined as that fraction which is precipitated by a large excess of heptane but which is soluble in toluene. "Toluene insolubles" are defined as that fraction which is insoluble in toluene. "Saturates" are defined as that fraction which is eluted by n-heptane from an alumina/silica gel column. "Cyclics" as that fraction which is eluted by toluene, and "resins" as that fraction which is eluted by 50/50 mixture of toluene and absolute ethanol.

It will be seen that the blown bitumen has a higher level of saturates than any of the hardened extracts.

The softening point and penetration tests referred to above are standard tests for bitumens and are described in 'Petroleum Products Handbook' edited by Guthrie published 1960 by McGraw Hill.

In the examples set out in Table 2, the polychlorprene identified as Butachlor SC-22 is a peptised sulphur/chloroprene copolymer sold by Distugil S.A. (of the type sometimes referred to as sulphur modified polychloroprene) with a Mooney viscosity of $ML_{1+4}$ of 45 to 54.

The identification given to the bitumen and hardened extract for example 115/15 represents the softening point and the penetration as given above in Table 1.

The EPDM rubber used in the Examples was a terpolymer of approximate composition 81 mole % ethylene, 17 mole % propylene, and 2 mole % ethylidenenorbornene, sold by Esso as Vistolan 3708.

The blends were cured using the curing systems and conditions given in Table 2. Four different curing systems were used. Cure system P was an active cure system as used for EPDM rubbers. Such cure systems are too active for polychloroprene and cure system Q was used for blends where the rubbery component of the blend consisted entirely or mainly of polychloroprene. Cure system R was intermediate in activity between Cure systems P and Q and was used in blends where neither polychloroprene or EPDM predominated.

Cure system S was similar to cure system P but it contained in addition magnesium oxide and Nonox OD and was used when only a minor amount of polychloroprene was used in the blends.

In Table 2 the experiments identified by letters A to Q are comparative tests not according to the invention while the experiments identified by numbers are examples according to the invention.

A consideration of Tests A to F shows that as the proportion of bitumen in bitumen:polychloroprene blends is increased from 100 to 150 parts per 100 parts of polychloroprene there is a considerable deterioration in physical properties, and that the replacement of some of the polychloroprene by EPDM leads to no significant improvement in physical properties taken as a whole. Thus where in Test C the tensile strength is 8.0 $MN/m^2$ the tear strength is only 12 N/mm.

A consideration of Test G and Example 1 compared with Tests B and C shows that the addition of EPDM to hardened extract/polychloroprene blends improves physical properties giving higher tensile strength, modulus at 300% extension and tear strength.

A consideration of Test H and Examples 2, 3 and 4 shows that up to 50% by weight of the polychloroprene can be replaced by EPDM without any substantial reduction in tensile strength and with an increase in M300 (modulus at 300% extension) and tear strength.

Tests J and K show the deterioration in tensile strength and modulus which takes place when the blend contains a high proportion of EPDM rubber, while Test M shows the low tensile strength, modulus and tear strength of blends of hardened extract and EPDM rubber alone. In view of the poor physical properties of such a blend it is surprising that EPDM rubber can be incorporated in polychloroprene/hardened blends in substantial amounts without any substantially adverse effects on physical properties, and indeed in the case of some physical properties e.g. tear strength, giving a substantial improvement.

Comparison of Example 5 with Test N demonstrates that when a polychloroprene/EPDM blend is extended with hardened extract and HAF carbon black the tensile strength at break of the vulcanisate is twice that of a vulcanisate made by extending a similar composition with 115/15 bitumen and HAF carbon black.

TABLE 2

| Experiment | Polychloroprene Butaclor SC-22 Parts | Bituminous Material Parts | | Other Reagents Parts | | Shore A Hardness | Tensile Strength $MN/n^2$ | M300 $MN/n^2$ | Elongation at Break % | Tear Strength N/mm | Brittle Temp. °C |
|---|---|---|---|---|---|---|---|---|---|---|---|
| Test A | 100 | 115/15 Bitumen | 100 | Cure System Q | | 49 | 18.2 | 12.0 | 400 | 43 | −40 |
| Test B | 100 | 115/15 Bitumen | 150 | Cure System Q | | 43 | 6.2 | 1.7 | 620 | 23 | −30 |
| Test C | 90 | 115/15 Bitumen | 150 | Vistolan 3708 Cure System Q | 10 | 48 | 8.0 | 1.2 | 860 | 12 | −35 |
| Test D | 50 | 115/15 Bitumen | 150 | Vistolan 3708 Cure System R | 50 | 56 | 3.1 | 1.5 | 750 | 18 | −40 |
| Test E | 10 | 115/15 Bitumen | 150 | Vistolan 3708 Cure System P | 90 | 59 | 8.0 | 1.6 | 850 | 10 | −55 |
| Test F | — | 115/15 Bitumen | 150 | Vistolan 3708 Cure System P | 100 | 59 | 6.5 | 1.3 | 800 | 12 | −55 |
| Test G | 100 | HE 150/1 Type B | 150 | Cure System Q | | 54 | 12.2 | 8.1 | 490 | 63 | −25 |
| Example 1 | 90 | HE 150/1 Type B | 150 | Vistolan 3708 Cure System Q | 10 | 53 | 17 | 11.4 | 400 | 72 | −25 |
| Test H | 100 | HE 150 Type A | 150 | Cure System Q | | 53 | 12.1 | 4.5 | 650 | 41 | −20 |
| Example 2 | 90 | HE 150 Type A | 150 | Vistolan 3708 Cure System Q | 10 | 50 | 11.4 | 5.3 | 580 | 45 | −30 |

TABLE 2-continued

| Experiment | Polychloroprene Butaclor SC-22 Parts | Bituminous Material Parts | | Other Reagents Parts | | Shore A Hardness | Tensile Strength MN/n² | M300 MN/n² | Elongation at Break % | Tear Strength N/mm | Brittle Temp. °C |
|---|---|---|---|---|---|---|---|---|---|---|---|
| Example 3 | 75 | HE 150 Type A | 150 | Vistolan 3708 Cure System Q | 25 | 50 | 10.3 | 4.8 | 600 | 47 | −30 |
| Example 4 | 50 | HE 150 Type A | 150 | Vistolan 3708 Cure System R | 50 | 58 | 11.5 | 680 | 49 | | −35 |
| Test J | 25 | HE 150 Type A | 150 | Vistolan 3708 Cure System S | 75 | 77 | 7.8 | 5.3 | 550 | 41 | −30 |
| Test K | 10 | HE 150 Type A | 150 | Vistolan 3708 Cure System S | 90 | 76 | 3.5 | 3.1 | 600 | 31 | −50 |
| Test M | — | HE 150 Type A | 150 | Vistolan 3708 Cure System P | 100 | 75 | 4.4 | 2.7 | 500 | 27 | −45 |

Cure System P  ZnO 5.0, Stearic Acid 1.0, Sulphur 1.5, MBT 0.5, TMTDS 1.5  Moulded for 25 mins at 160° C
Cure System Q  Nonox OD 2.0, MgO 4.0, ZnO 5.0, ET 0.5, Stearic Acid 0.5  Moulded for 1 hour at 160° C
Cure System R  Nonox OD 1.0, MgO 4.0, ZnO 5.0, ET 0.25, Stearic Acid 0.75, Sulphur 0.75 MBT 0.25, TMTDS 0.75  Moulded for 35 mins at 160° C
Cure System S  MgO 1.0, ZnO 5.0, Sulphur 1.5, Stearic Acid 1.0, Nonox OD 1.0, MBT 0.5, TMTDS 1.5  Moulded for 30 mins at 160° C

| Experiment | Polychloroprene Butaclor SC-22 Parts | Bituminous Material Parts | | Other Reagents Parts | | Shore A Hardness | Tensile Strength MN/n² | M300 MN/n² | Elongation at Break % | Tear Strength N/mm | Brittle Temp. °C |
|---|---|---|---|---|---|---|---|---|---|---|---|
| Test N | 90 | 115/15 Bitumen | 150 | Vistolan 3708 HAF black Cure System Q | 10 60 | 60 | 10.0 | 4.5 | 700 | 47 | −30 |
| Experiment 5 | 90 | HE 100 Type A | 150 | Vistolan 3708 HAF black Cure System Q | 10 60 | 56 | 19.9 | 6.1 | 800 | 64 | −20 |

Notes
Nonox OD is octylated diphenylamine sold by ICI Limited.
ET is ethylene thiourea MBT is 2-mercaptobenzthiazole, TMTDS is tetramethyl thiuram disulphide.
Brittle temperature is the temperature at which the sample snapped when bent through 180° round a ⅛″ diameter rod.

I claim:

1. A vulcanizable composition comprising (a) a rubber component containing a polychloroprene and a rubbery terpolymer of ethylene, propylene, and a diene or triene monomer said terpolymer containing at least 50% by weight of units derived from ethylene the weight ratio of said polychloroprene to said terpolymer of from 1:005 to 1:1.5, and (b) 3 to 300 parts by weight, per 100 parts by weight of rubbery component of a hardened extract obtained by blowing air at elevated temperature into a solvent extract of a distillate petroleum fraction boiling in the lubricating oil boiling range and containing a major proportion of aromatic hydrocarbons and having a saturated hydrocarbon content of not more than 10% by weight.

2. A composition according to claim 1 containing a vulcanisation agent.

3. A composition according to claim 1 wherein the polychloroprene has a Mooney viscosity (ML 1+4) of 55 to 65.

4. A composition according to claim 1 wherein the said terpolymer contains 70% by weight of units derived from ethylene 5. A composition according to claim 4 wherein the said terpolymer contains 49 to 20% by weight of units derived from propylene and 1 to 5% by weight of units derived from diene monomer.

6. A composition according to claim 5 wherein the diene monomer is ethylidene-norbornene.

7. A composition according to claim 1 wherein there are at least 0.08 parts of said terpolymer per part of polychloroprene by weight.

8. A composition according to claim 7 wherein there are at least 0.1 parts of said terpolymer per part of polychloroprene by weight.

9. A composition according to claim 7 wherein there are not more than 1.2 parts by weight of said terpolymer per part of polychloroprene by weight.

10. A composition according to claim 1 wherein the said hardened extract has a softening point in the range 85° to 150° C.

11. A composition according to claim 10 wherein the said hardened extract has a softening point in the range 100° to 150° C.

12. A composition according to claim 10 which contains at least 15 parts by weight of said hardened extract per 100 parts of rubber component.

13. A composition according to claim 12 which contains at least 25 parts by weight of said hardened extract per 100 parts of rubber components.

14. A composition according to claim 13 which contains at least 45 parts by weight of said hardened extract per 100 parts of rubber component.

15. A composition according to claim 14 which contains not more than 200 parts by weight of said hardened extract per 100 parts of rubber components.

16. A composition according to claim 15 which contains not more than 150 parts of said hardened extract per 100 parts of rubber component.

17. A vulcanised article made by heating a composition according to claim 2 which contains a vulcanising agent.

18. An article made by subjecting a composition according to claim 2 to a forming operation before vulcanisation.

* * * * *

UNITED STATES PATENT AND TRADEMARK OFFICE
CERTIFICATE OF CORRECTION

PATENT NO. : 4,100,123
DATED : July 11, 1978
INVENTOR(S) : PETER HENRY WESTERMANN It is certified that error appears in the above-identified patent and that said Letters Patent are hereby corrected as shown below:

Example 4, col. 8, under "M300 $MN/n^2$", insert --5.1--, and move each of "680", "49" and "-35" over one column.

Claim 1, line 35, "1:005" should read --1:0.05--

Signed and Sealed this

Sixth Day of February 1979

[SEAL]

Attest:

RUTH C. MASON
Attesting Officer

DONALD W. BANNER
Commissioner of Patents and Trademarks